United States Patent
Oishi et al.

(10) Patent No.: US 10,850,738 B2
(45) Date of Patent: Dec. 1, 2020

(54) DRIVING SUPPORT APPARATUS

(71) Applicant: DENSO CORPORATION, Kariya (JP)

(72) Inventors: Masayoshi Oishi, Kariya (JP); Koji Fujiki, Kariya (JP)

(73) Assignee: DENSO CORPORATION, Kariya (JP)

(*) Notice: Subject to any disclaimer, the term of this patent is extended or adjusted under 35 U.S.C. 154(b) by 95 days.

(21) Appl. No.: 16/088,266

(22) PCT Filed: Mar. 30, 2017

(86) PCT No.: PCT/JP2017/013310
§ 371 (c)(1),
(2) Date: Sep. 25, 2018

(87) PCT Pub. No.: WO2017/170892
PCT Pub. Date: Oct. 5, 2017

(65) Prior Publication Data
US 2019/0084572 A1 Mar. 21, 2019

(30) Foreign Application Priority Data
Mar. 30, 2016 (JP) ................................. 2016-068987

(51) Int. Cl.
B60W 30/18 (2012.01)
B60W 50/02 (2012.01)
(Continued)

(52) U.S. Cl.
CPC ......... B60W 30/18163 (2013.01); B60Q 1/34 (2013.01); B60Q 1/346 (2013.01);
(Continued)

(58) Field of Classification Search
CPC .......... B60W 30/18163; B60W 10/20; B60W 50/02; B60Q 1/34; B60Q 1/346; B62D 6/00; B62D 15/0255
See application file for complete search history.

(56) References Cited

U.S. PATENT DOCUMENTS

2003/0025597 A1* 2/2003 Schofield ........... G06K 9/00798
340/435
2009/0189756 A1* 7/2009 Wu .......................... B60Q 1/34
340/475
(Continued)

FOREIGN PATENT DOCUMENTS

JP 2005-165708 A 6/2005
JP 2007-283933 A 11/2007
(Continued)

Primary Examiner — Rami Khatib
(74) Attorney, Agent, or Firm — Maschoff Brennan

(57) ABSTRACT

A reception unit receives a command which is either a leftward lane change command or a rightward lane change command. A traveling control unit controls the lane change, based on the lane change command. A lighting control unit turns on a direction indicator. A command determination unit causes the traveling control unit to cancel control of both the leftward and rightward lane changes and causes the lighting control unit to turn off the direction indicator, in spite of the reception unit receiving a first lane change command to either leftward or rightward direction as a lane change, and the traveling control unit starting first lane change control, if a second lane change command, which is in a direction opposite to the first lane change, is received before part of the vehicle enters an adjacent lane which is adjacent to a traveling lane where the vehicle travels.

4 Claims, 5 Drawing Sheets

(51) Int. Cl.
*B60W 10/00* (2006.01)
*G08G 1/16* (2006.01)
*B62D 6/00* (2006.01)
*B60W 10/20* (2006.01)
*B60Q 1/34* (2006.01)
*B60W 30/10* (2006.01)
*B62D 15/02* (2006.01)

(52) U.S. Cl.
CPC ............ *B60W 10/00* (2013.01); *B60W 10/20* (2013.01); *B60W 30/10* (2013.01); *B60W 50/02* (2013.01); *B62D 6/00* (2013.01); *B62D 15/0255* (2013.01); *G08G 1/16* (2013.01)

(56) References Cited

U.S. PATENT DOCUMENTS

| | | | | |
|---|---|---|---|---|
| 2014/0074356 | A1* | 3/2014 | Bone | G08G 1/167 701/41 |
| 2016/0091896 | A1* | 3/2016 | Maruyama | B60W 50/10 701/23 |
| 2017/0018189 | A1* | 1/2017 | Ishikawa | B62D 15/0255 |
| 2017/0225685 | A1* | 8/2017 | Aoki | B60W 50/082 |
| 2017/0341652 | A1* | 11/2017 | Sugawara | B60W 30/095 |

FOREIGN PATENT DOCUMENTS

| | | |
|---|---|---|
| JP | 2008-012989 A | 1/2008 |
| JP | 2008-094111 A | 4/2008 |
| JP | 2010-221797 A | 10/2010 |

* cited by examiner

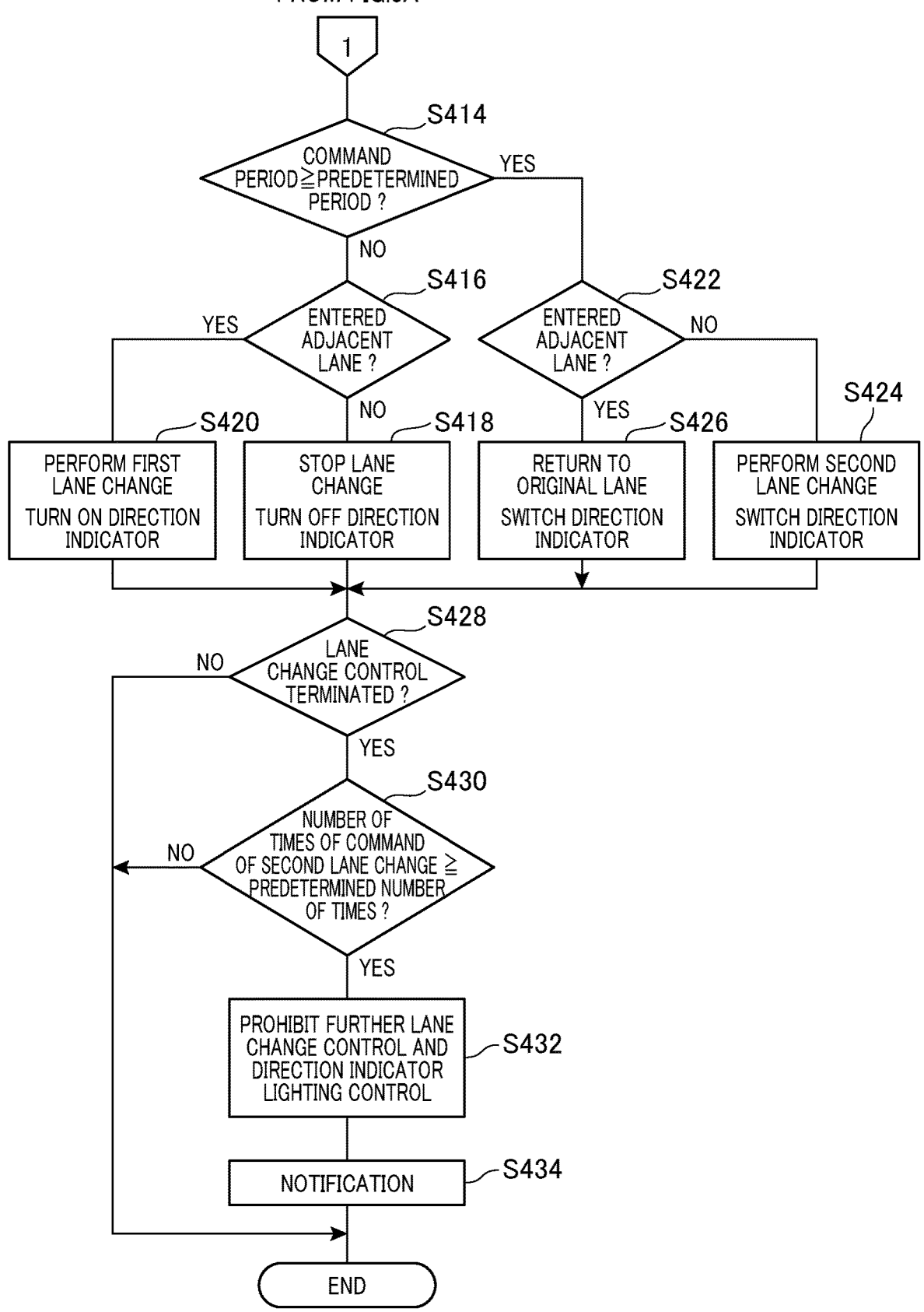

DRIVING SUPPORT APPARATUS

CROSS-REFERENCE TO RELATED APPLICATION

The present application is a national stage application under 35 U.S.C. § 371(c) of PCT Application No. PCT/JP2017/013310, filed on Mar. 30, 2017, which claims the benefit of priority from earlier Japanese Patent Application No. 2016-68987 filed in Japan Patent Office on Mar. 30, 2016, the entire description of which is incorporated herein by reference.

TECHNICAL FIELD

The present disclosure relates to a technique for controlling lane change of vehicles.

BACKGROUND ART

Techniques for controlling lane change of vehicles are well known. In such a technique, lane change is controlled upon reception of a command therefor from a vehicle occupant through a direction indicator switch, or the like. Patent Literature 1 (PTL 1) discloses a traveling assistance device in which, upon reception of a lane change command from a vehicle occupant, the device determines a traveling path for changing lane to a lane adjacent to the lane the vehicle is traveling.

CITATION LIST

Patent Literature

[PTL 1] JP 2008-094111 A

SUMMARY OF THE INVENTION

The occupant may cancel the lane change command to stop lane change, in spite of the occupant's previous lane change command, for example, when the occupant notices another vehicle traveling in an adjacent lane to which the vehicle is to change lanes, and approaching from behind the vehicle the occupant is on board. In this case, when the occupant operates the direction indicator switch to cancel the previous lane change command, the device may erroneously command lane change to the opposite direction.

In such a conventional traveling assistance device disclosed in PTL 1, the device controls lane change and lighting of direction indicators, based on the command of lane change received from the occupant of the vehicle. As a result of specific studies, the inventors have found an issue that, if the occupant erroneously commands an opposite direction lane change to cancel the command of the first lane change, lane change and lighting of direction indicators may be controlled based on the erroneous command.

An aspect of the present disclosure is to provide a technique to appropriately control lane change of the vehicle without unconditionally responding to the lane change command which is received from an input device.

An aspect of the present disclosure includes a reception unit, a traveling control unit, a lighting control unit, and a command determination unit.

The reception unit receives a command which is either a leftward lane change command or a rightward lane change command from an input device, the command being inputted by an occupant of a vehicle. The traveling control unit controls the lane change based on the lane change command which is received by the reception unit. The lighting control unit turns on a lane change side direction indicator, based on the lane change command.

The command determination unit cancels the control of both the leftward and the rightward lane changes performed by the traveling control unit and causes the lighting control unit to turn off the direction indicator, in spite of the reception unit receiving a command of a first lane change to either leftward or rightward direction as a lane change, and the traveling control unit starting control of the first lane change, if a second lane change command, which is in a direction opposite to the first lane change, is received before part of the vehicle enters an adjacent lane which is adjacent to a traveling lane where the vehicle travels.

With this configuration, the driving support apparatus does not unconditionally respond to the lane change command which is received from the input device. Instead, if the apparatus receives a second lane change command in a direction opposite to the first lane change direction while controlling the first lane change, the apparatus executes control of lane change neither leftward nor rightward, as long as at least part of the vehicle is yet to enter the adjacent lane. Furthermore, the direction indicators are turned off.

Accordingly, while the driving support apparatus controls the first lane change, if, for example, the apparatus receives an erroneous command of second lane change in an opposite direction, control of the second lane change is not executed, and accordingly the second lane change side direction indicator is not turned on. This enables appropriate control of vehicle lane change.

Reference signs in parentheses in the claims indicate correspondence with the specific means described in the following embodiments as a mode, and should not limit the technical scope of the present disclosure.

BRIEF DESCRIPTION OF THE DRAWINGS

FIG. 3B is a flowchart illustrating a driving support process.

DESCRIPTION OF EMBODIMENTS

Figure 1:
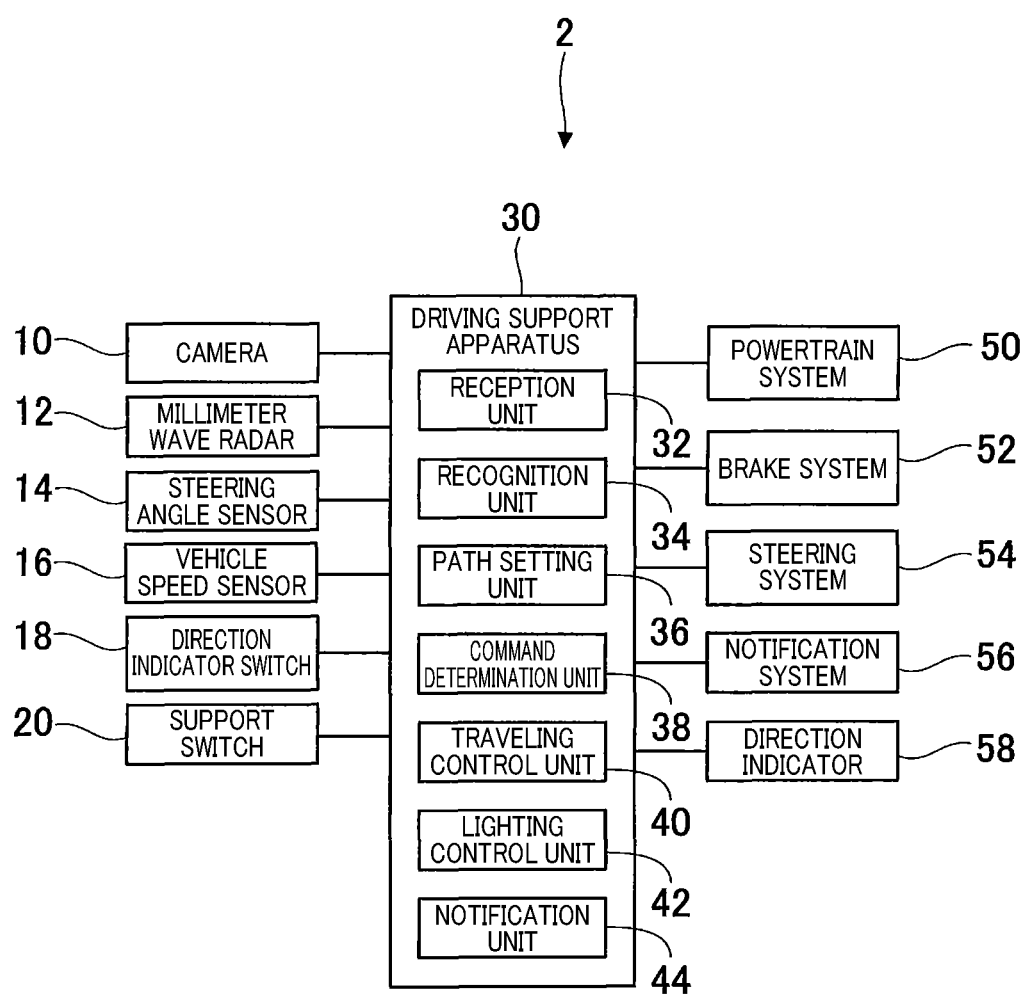
FIG. 1 is a block diagram illustrating a driving support apparatus of the present embodiment.

Referring to the drawings, embodiments of the present disclosure will be described.

1. Configuration

As shown in FIG. 1, an in-vehicle driving support system 2 includes camera 10, a millimeter wave radar 12, a steering angle sensor 14, a steering angle sensor 16, direction indicator switch 18, a support switch 20, a driving support apparatus 30, a powertrain system 50, a brake system 52, a steering system 54, a notification system 56, and direction indicators 58.

The camera 10 is mounted, for example, to the front and the rear of the vehicle, and the camera 10 outputs image data of the surroundings of the vehicle 100 to the driving support apparatus 30 as detection information.

The millimeter wave radar 12 is mounted, for example, to the front and rear of the vehicle. Specifically, the millimeter wave radar 12 transmits millimeter waves to an object such as another vehicle or a pedestrian around the vehicle, receives waves reflected from the object, and calculates the distance to the object, based on the time taken for receiving the reflected waves. Furthermore, the azimuth, that is, the angle, of the object relative to the vehicle depends on the direction of receiving the reflected wave. The millimeter wave radar 12 outputs the calculated distance and the angle to the driving support apparatus 30 as detection information.

Instead of the radar which irradiates radio waves such as the millimeter wave radar 12, a LIDAR which irradiates laser light may be used. LIDAR is an abbreviation of light detection and ranging.

The steering angle sensor 14 detects steering angle of the vehicle. The vehicle speed sensor 16 detects speed of the vehicle 100.

The direction indicator switch 18 is an input device by which the driver, that is an occupant of the vehicle, commands the traveling direction of the vehicle be changed either leftward or rightward. The direction indicator switch 18 may be a lever switch or a press button switch. The direction indicator switch 18 is not limited to a mechanical switch, but may be a switch indicated on a display. Furthermore, the vehicle traveling direction may be inputted not only by switches, but also by voice.

The support switch 20 is a switch that the vehicle occupant operates. If the support switch 20 is in an on state, the driving support apparatus 30 is permitted to execute control of lane change, and if the support switch 20 is in an off state, the driving support apparatus 30 is prohibited from executing control of lane change.

The driving support apparatus 30 includes a microcomputer which is provided with a CPU and a semiconductor memory such as RAM, ROM, and a flash memory. The number of microcomputers constituting the driving support apparatus 30 may be one or greater.

Various functions of the driving support apparatus 30 are accomplished by the CPU executing a program stored in a non-transitory tangible computer readable medium such as ROM or a flash memory. By executing the program, processes corresponding to the program are executed.

As functional configurations accomplished by the CPU executing the program, the driving support apparatus 30 includes a reception unit 32, a recognition unit 34, a path setting unit 36, a command determination unit 38, a traveling control unit 40, a lighting control unit 42, and a notification unit 44. The techniques to accomplish these elements configuring the driving support apparatus 30 are not limited to use software, but a part or all the elements may be accomplished using hardware which is a combination such as including a logic circuit and an analog circuit.

The reception unit 32 receives a command of the vehicle traveling direction which is inputted by the vehicle occupant operating the direction indicator switch 18.

The recognition unit 34 obtains detection information from the camera 10 and the millimeter wave radar 12, which detect an object around the vehicle and a lane of a road the vehicle travels. The recognition unit 34 recognizes the object around the vehicle and the lane of the road the vehicle travels, based on the detection information the recognition unit 34 obtains.

Figure 2:
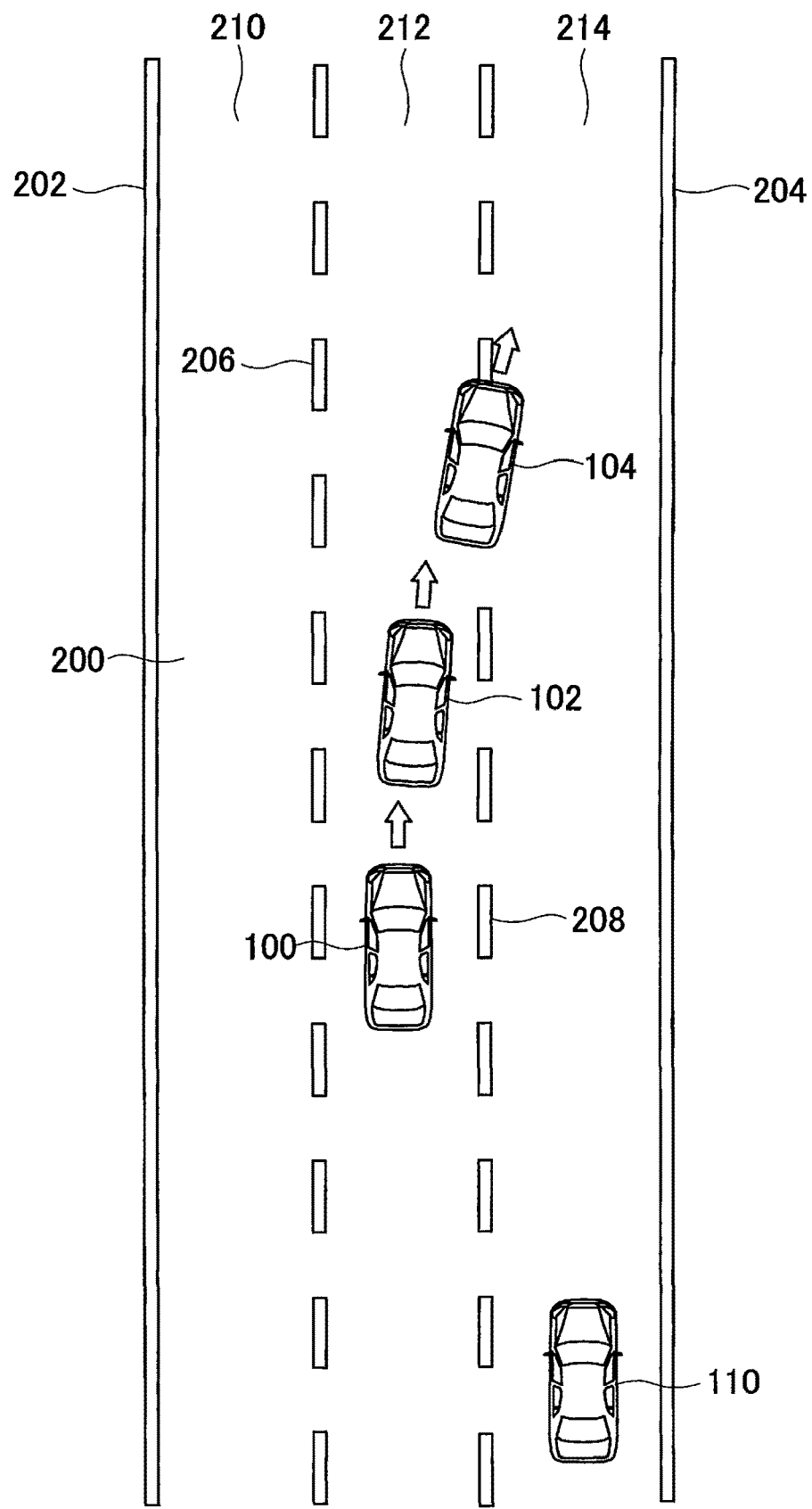
FIG. 2 is a schematic diagram illustrating lane change of the vehicle.

For example, as shown in FIG. 2, the recognition unit 34 calculates positions of white lines 202, 204, 206, and 208 on a road 200 where the vehicle 100 travels, lane width which refers to the distance between the white lines, the curvature of the white lines, and the like, based on the image data ahead of and behind the vehicle 100 captured by the camera 10.

The recognition unit 34 recognizes the white lines 202, 204, 206 and 208 to recognize lanes 210, 212 and 214 of the road 200 where the vehicle 100 travels. FIG. 2 shows the vehicle 100 which is referred to as a vehicle 102 or 104 depending on the position before making lane change.

Furthermore, of the lane 210, 212, and 214, the recognition unit 34 recognizes the traveling lane 212 where the vehicle travels, and the adjacent lanes 210 and 214 adjacent to the traveling lane 212, based on the positions of the white lines 202, 204, 206 and 208, and the position of the vehicle 100. The recognition unit 34 obtains position information of the vehicle 100 from a GPS device, not shown.

Furthermore, the recognition unit 34 determines whether there is an intersection ahead of the traveling direction of the vehicle 100, based on the detection information in the forward direction of the vehicle 100 obtained from the camera 10. The determination result is outputted to the command determination unit 38.

The recognition unit 34 recognizes a vehicle 110 which is traveling near the vehicle 100, based on the detection information in the forward and rearward directions of the vehicle 100 obtained from the camera 10 and the millimeter wave radar 12.

The recognition unit 34 calculates the position of the vehicle 110, and the speed of the vehicle 110 based on the image data in the forward and rearward directions of the vehicle captured by the camera 10. The speed of the vehicle in this case is calculated based on a variation in position of the vehicle 110. The recognition unit 34 also calculates the position of the vehicle 110 and the speed of the vehicle 110 relative to the vehicle 100, based on the detection information in the forward and rearward directions of the vehicle 100 obtained from the millimeter wave radar 12.

The path setting unit 36 determines a traveling path of the vehicle so as to avoid collision with another vehicle when the traveling control unit 40 controls lane change, based on the recognition result of the recognition unit 34 and the output of the vehicle speed sensor 16. The path setting unit 36 may newly determine a traveling path when another vehicle traveling in the adjacent lane changes speed during lane change of the vehicle equipped with the apparatus. The traveling path is determined such that the value of the lateral acceleration will have a value that is comfortable for the occupants of the vehicle.

When the support switch 20 is in an on state, and when the driving support apparatus 30 is permitted to execute control of lane change, the command determination unit 38 commands the traveling control unit 40 to control lane change, based on the command of lane change that the reception unit 32 receives from the direction indicator switch 18. Furthermore, the traveling control unit 38 commands the lighting control unit 42 to control turning on and turning off of a direction indicator 58.

The command determination unit 38 determines whether the command of the traveling direction change that the reception unit 32 receives from the direction indicator switch 18 is for turning right or left, or for lane change to left or right, based on the determination result, mentioned above, of the recognition unit 34 which indicates whether there is an intersection ahead of the vehicle 100. When there is no intersection ahead of the vehicle 100, and when the reception unit 32 receives the command of the traveling direction change from the direction indicator switch 18, the command determination unit 38 determines that the command is for lane change.

The command determination unit 38 determines whether the traveling control unit 40 should execute control of lane change, and whether the lighting control unit 42 should turn on a direction indicator 58, based on the lane change command that the reception unit 32 receives from the direction indicator switch 18.

In response to the command for controlling lane change from the command determination unit 38, the traveling control unit 40 controls the powertrain system 50, the brake system 52, and the steering system 54, so that while the vehicle changes lanes, the vehicle travels along the traveling path which is determined by the path setting unit 36. In other words, traveling control unit 40 controls the speed of the vehicle and steering angle of the vehicle while the vehicle changes lanes.

If the support switch 20 is in an on state, and if the driving support apparatus 30 is permitted to control lane change, the lighting control unit 42 turns on or off a direction indicator 58, based on the command of the command determination unit 38. If the support switch 20 is in an off state, and if the driving support apparatus 30 is not permitted to control lane change, the lighting control unit 42 turns on or off a direction indicator 58, according to the output of the direction indicator switch 18.

The notification unit 44 commands that the notification system 56 activate a speaker, a display, a lamp, a vibrator, or the like to issue a predetermined notification through voice, image, lighting of a lamp, vibration, or the like.

If an internal combustion engine is installed in the vehicle as a driving source, the powertrain system 50 controls the position of the throttle device and the fuel injection amount, and if a motor is installed in the vehicle as a driving source, the powertrain system 50 controls power supplied to a motor. These two types of control are conducted based on the drive output commanded by the traveling control unit 40.

According to the braking force commanded by the traveling control unit 40, the brake system 52 controls an actuator which is provided in a hydraulic circuit of a hydraulic brake. If a motor is installed in the vehicle as a driving source, the brake system 52 may control power supplied to the motor, according to the braking power commanded by the traveling control unit 40, to thereby generate braking power generated by the regenerative brake.

The steering system 54 activates the steering wheel according to torque commanded by the traveling control unit 40 to steer the vehicle.

The notification system 56 activates a speaker, a display, a lamp, a vibrator, or the like, according to the command of the notification unit 44.

2. Processing

Referring to the flowchart shown in FIGS. 3A and 3B, description will be given of the driving support process that is executed by the driving support apparatus 30. The flowchart shown in FIGS. 3A and 3B is cyclically executed.

Figure 3A:
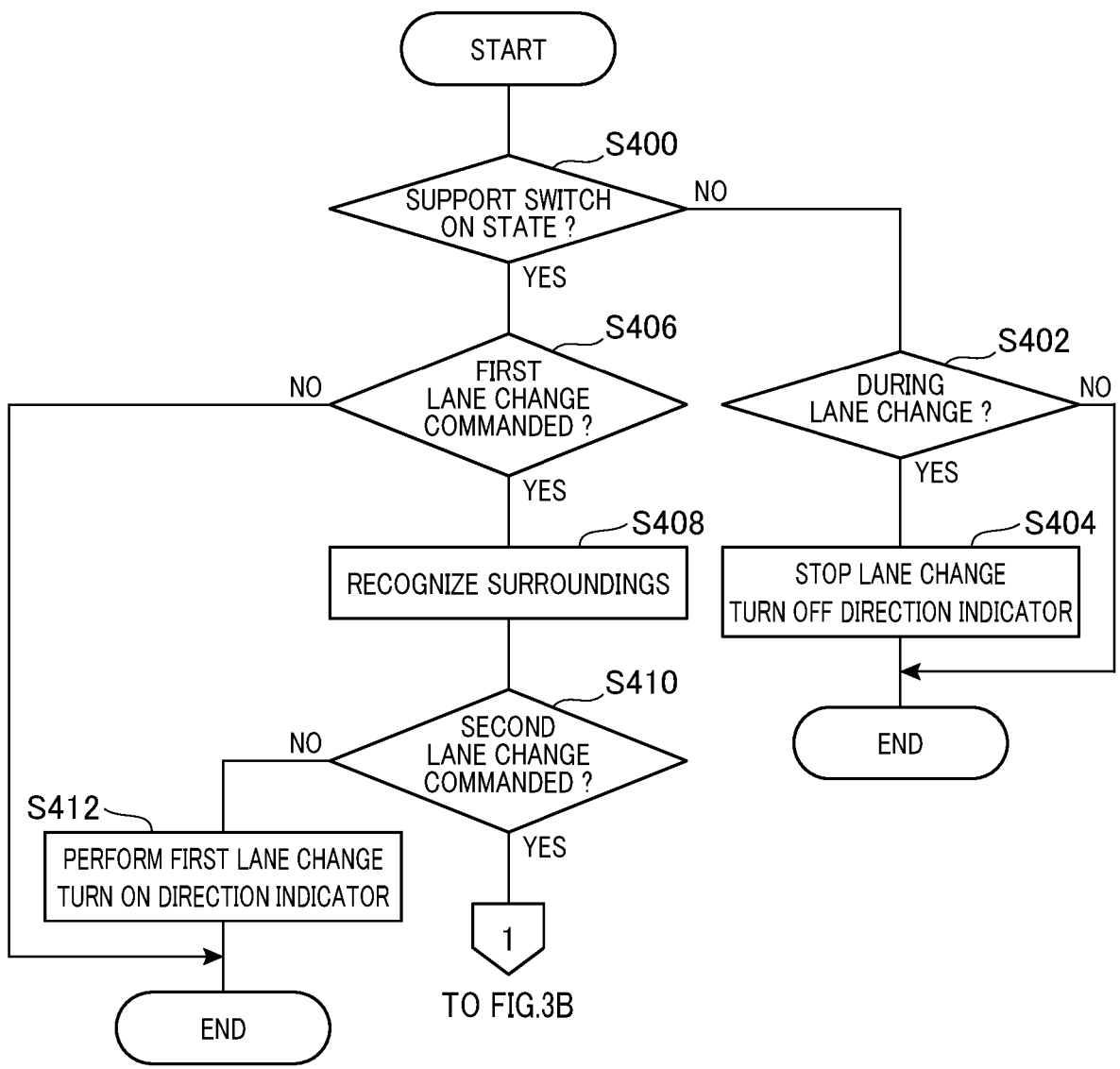
FIG. 3A is a flowchart illustrating a driving support process.

At step S400 of FIG. 3A, the command determination unit 38 determines whether the output of the support switch 20 is in an on state. If the determination at step S400 is No, that is, if the support switch 20 is in an off state, the driving support apparatus 30 is prohibited from controlling lane change.

In this case, at step S402, the command determination unit 38 determines whether the traveling control unit 40 is in the process of controlling lane change. If the determination at step S402 is Yes, that is, if the traveling control unit 40 is in the process of controlling lane change, control proceeds to step S404 where the command determination unit 38 causes the traveling control unit 40 to stop lane change. Furthermore, if a direction indicator 58 is in an on state, the command determination unit 38 causes the lighting control unit 42 to turn off the direction indicator 58.

If the determination at step S400 is Yes, that is, if the support switch 20 is in an on state, the driving support apparatus 30 is permitted to control lane change. In this case, the command determination unit 38 determines, at step S406, whether the reception unit 32 has received a command of a first lane change either to the left or the right from the direction indicator switch 18, when the vehicle travels in the traveling lane.

If the determination at step S406 is No, that is, if the first lane change is not commanded, the command determination unit 38 terminates the present process. If the determination at step S406 is Yes, that is, if the first lane change is commanded, the recognition unit 34 recognizes, at step S408, an object around the vehicle and a lane of a road that the vehicle travels, based on the detection information obtained from the camera 10 and the millimeter wave radar 12.

After receiving the first lane change, the command determination unit 38 determines, at step S410, whether the reception unit 32 has received a command of a second lane change, which is in a direction opposite to the first lane change, from the direction indicator switch 18.

If the determination at step S410 is No, that is, if the command of the second lane change has not been received, the command determination unit 38 commands, at step S412, the traveling control unit 40 to control lane change according to the first lane change command. In this case, the traveling control unit 40 controls the traveling of the vehicle so that the vehicle travels along the traveling path that is determined by the path setting unit 36. Furthermore, the command determination unit 38 causes the lighting control unit 42 to turn on a direction indicator 58 which corresponds to the traveling direction indicated by the first lane change.

For example, as shown in FIG. 2, when the vehicle 100 performs the first lane change, which is a rightward lane change from the traveling lane 212 to the adjacent lane 214, the occupant of the vehicle 100 operates the direction indicator switch 18 to command the rightward lane change. In this case, as indicated by the solid line 300 of FIG. 4, the direction indicator switch 18 outputs a signal which commands the rightward change of the traveling direction. The direction indicator switch 18 as shown in FIG. 4 has outputs of three states which are rightward position, leftward position, and neutral position.

Figure 4:
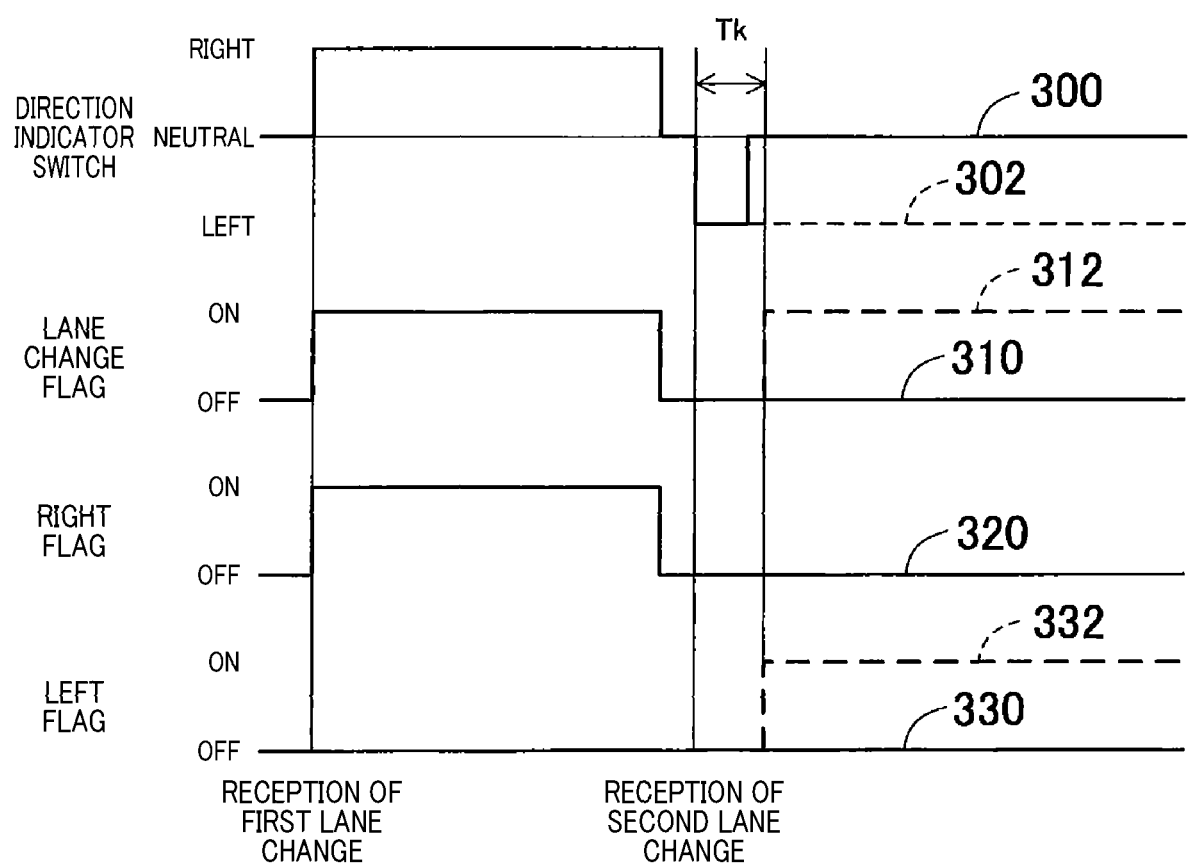
FIG. 4 is a timing diagram illustrating change of a command for lane change.

Then, as indicated by the solid lines 310 and 320 of FIG. 4, the command determination unit 38 turns on a lane change flag which indicates control of lane change performed by the traveling control unit 40, and then turns on a right flag which indicates the rightward lane change. As indicated by the solid line 330, a left flag which indicates the leftward lane change is kept turned off.

The command determination unit 38 then commands the traveling control unit 40 to control the rightward first lane change, and then commands the lighting control unit 42 to turn on the direction indicator 58 which indicates the rightward lane change.

If the determination at step S410 is Yes, that is, if the reception unit 32 has received the command of the second lane change, the command determination unit 38 determines, at step S414 of FIG. 3B, whether a command period where the reception unit 32 is receiving the command of the second lane change is not less than the predetermined period.

If the command of the second lane change is performed by a switch such as the direction indicator switch 18, the command period refers to a duration of time where the rightward or leftward second lane change is being commanded. If the command of the second lane change is performed by voice, the command period refers to a duration of time from when the rightward or leftward second lane change is commanded by voice, to when the second lane change is terminated, or to when the stop of the second lane change is commanded by voice during the lane change.

The predetermined period is set to a length where the command determination unit 38 can determine that the occupant of the vehicle has operated the direction indicator switch 18 to intentionally command the second lane change. For example, the predetermined period is set to about two to three seconds. If the occupant of the vehicle has erroneously operated the direction indicator switch 18 to command the second lane change, the occupant may return the direction indicator switch 18 to the neutral position immediately.

Accordingly, in spite of the leftward second lane change commanded during the rightward first lane change, if the command period is less than a predetermined period Tk as indicated by the solid line 300 of FIG. 4, the direction indicator switch 18 may be determined to have been returned to the neutral position because the occupant of the vehicle erroneously operated the direction indicator switch 18.

As indicated by the dashed line 302 of FIG. 4, if the leftward command period of the second lane change is not less than the predetermined period Tk, the occupant of the vehicle can be determined to have intentionally operated the direction indicator switch 18.

If the determination at step S414 is No, that is, if the command period is less than the predetermined period, the command determination unit 38 determines that the occupant may have erroneously operated the direction indicator switch 18 trying to cancel the command of the first lane change while the traveling control unit 40 controls the lane change, and may have commanded the second lane change. In this case, the command determination unit 38 determines at step S416, whether at least part of the vehicle has entered the first lane change side adjacent lane, based on the position of the vehicle and the position of the white line.

If the determination at step S416 is No, that is, if at least part of the vehicle, as indicated by the vehicles 100 and 102 of FIG. 2, has not entered the first lane change side adjacent lane 214, at step S418, the command determination unit 38 causes the traveling control unit 40 to stop the first lane change, and causes the lighting control unit 42 to turn off the direction indicator 58.

For example, as indicated by the solid line 300 of FIG. 4, if the direction indicator switch 18 commands the rightward second lane change while the leftward second lane change is being commanded, the command determination unit 38 turns off, as indicated by the solid lines 310 and 320 of FIG. 4, the lane change flag and the right flag. Then, the command determination unit 38 causes the traveling control unit 40 to cancel control of the first lane change, and also causes the lighting control unit 42 to turn off the direction indicator switch 58. Following the step S418, control proceeds to step S428.

If the determination at step S416 is Yes, that is, if at least part of the vehicle, as indicated by the vehicle 104 of FIG. 2, has already entered the first lane change side adjacent lane 214, the command determination unit 38 executes step S420.

At step S420, the command determination unit 38 continues the first lane change, and also continues lighting the first lane change side direction indicator 58, because the command period of the command of the second lane change is less than the predetermined period, that is, the occupant of the vehicle may erroneously have operated the direction indicator switch 18. Following the step S420, control proceeds to step S428.

If the determination at step S414 is Yes, that is, if the command period of the second lane change is not less than the predetermined period, the command determination unit 38 determines that the occupant has intentionally cancelled the first lane change through the operation of the direction indicator switch 18 to command the second lane change which is in a direction opposite to the first lane change.

If the determination at step S414 is Yes, the command determination unit 38 determines, at step S422, whether at least part of the vehicle has entered the first lane change side adjacent lane, based on the position of the vehicle and the position of the white line.

If the determination at step S422 is No, that is, if at least part of the vehicle, as indicated by the vehicles 100 and 102 of FIG. 2, has not entered the first lane change side adjacent lane 214, that is, the vehicle is still traveling in the traveling lane 212, the command determination unit 38 executes step S424.

At step S424, the command determination unit 38 causes the traveling control unit 40 to perform the leftward second lane change toward the adjacent lane 210, which is in a direction opposite to the first lane change, and also causes the lighting control unit 42 to switch the lighting of the direction indicators 58, i.e. to turn on the left direction indicator 58. Following the step S424, control proceeds to step S428.

If the determination at step S422 is Yes, that is, if at least part of the vehicle, as indicated by the vehicle 104 of FIG. 2, has entered the first lane change side adjacent lane, it is determined that the second lane change is a lane change to return to the traveling lane 212. In this case, the command determination unit 38 executes step S426.

At step S426, the command determination unit 38 causes the traveling control unit 40 to execute the second lane change, which is a leftward lane change to return to the traveling lane 212, that is, a lane change in a direction opposite to the first lane change, and causes the lighting control unit 42 to switch the lighting of the direction indicators 58, i.e. turn on the left direction indicator 58. Following the step S426, control proceeds to S428.

Thus, if the determination at step S414 is Yes, that is, as indicated by the dashed line 302 of FIG. 4, if the command period for the leftward second lane change is not less than the predetermined period Tk, the command determination unit 38 turns on, as indicated by the dashed lines 312 and 332, the lane change flag and the left flag, irrespective of the determination at S422. Then, the command determination unit 38 causes the traveling control unit 40 to command control of the leftward second lane change, and also causes the lighting control unit 42 to turn on the left direction indicator 58.

If the determination at step S428 is Yes, that is, if control of both the leftward and rightward lane change is terminated, the command determination unit 38 determines, at S430, whether the number of times of the second lane change command during control of the first lane change by the traveling control unit 40 is not less than a predetermined number of times. The predetermined number of times is set to one with which the cause of cancelling the first lane change and commanding the second lane change during control of the first lane change is determined to be due to abnormality such as a failure of the direction indicator switch 18.

As described above, if the determination at step S414 is Yes, that is, if the command period is not less than the predetermined period, the command determination unit 38 determines that the occupant has intentionally cancelled the first lane change and has commanded the second lane change which is in a direction opposite to the first lane change. However, if the number of times of cancelling the first lane change and commanding the second lane change is not less than the predetermined number of times, the direction indicator switch 18 may be defective.

If the determination at step S430 is Yes, the command determination unit 38 prohibits, at step S432, from controlling both the leftward and rightward lane change performed by the traveling control unit 40. This prohibition is to avoid control of lane change performed by the traveling control unit 40 in a possible state where the direction indicator switch 18 is defective. Furthermore, the command determination unit 38 prohibits the lighting control unit 42 from lighting the direction indicators 58.

Thus, in spite of the occupant's operation of the direction indicator switch 18, the traveling control unit 40 does not perform lane change, and the lighting control unit 42 does not turn on the direction indicators 58.

At step S434, the notification unit 44 causes the notification system 56 to issue a notification of having prohibited the lane change control, through voice, image, lighting of a lamp, vibration, or the like.

3. Advantageous Effects

According to the embodiment described above, the following advantageous effects can be obtained.

(1) The driving support apparatus does not unconditionally follow the command of both the leftward and rightward lane changes which is received from the direction indicator switch 18. Specifically, control of the lane change is not executed if at least part of the vehicle is yet to enter the adjacent lane, in spite of receiving the command for the second lane change during the control of the first lane change. Furthermore, a direction indicator 58 is turned off.

Accordingly, if, for example, the driving support apparatus receives an erroneous command of second lane change which is opposite to the first lane change direction, from the direction indicator switch 18, while the apparatus controls the first lane change, control of the second lane change is not executed, and thereby the second lane change side direction indicator 58 is not turned on. This enables appropriate control of vehicle lane change.

(2) The traveling control unit 40 is permitted to control the second lane change if the command period of cancelling the first lane change command and commanding the second lane change during the first lane change control, is not less than the predetermined period. Thus, lane change can be controlled by respecting the occupant's lane change command.

(3) The driving support apparatus prohibits further control of both the leftward and rightward lane changes performed by the traveling control unit 40 if the number of times of cancelling the first lane change command and commanding the second lane change during control of the first lane change becomes not less than the predetermined number of times. Thus, execution of the erroneous lane change can be reduced or prevented, the erroneous lane change being based on an erroneous command signal for lane change which is outputted from the direction indicator switch 18 that would possibly be defective.

In the embodiment described above, the direction indicator switch 18 corresponds to the input apparatus.

In the embodiment, S400, S402, S414, S416, S422, and S428 to S432, and part of S404, S406, S410, S412, S418, S420, S424, and S426 correspond to the processing as the command determination unit 38. Part of S406 and S410 correspond to the processing as the reception unit 32. S408 corresponds to the processing as the recognition unit 34. S434 corresponds to the processing as the notification unit 44. Part of S404, S412, S418, S420, S424, and S426 corresponds to the processing as the traveling control unit 40 and the lighting control unit 42.

4. Other Embodiments (1) If at least part of the vehicle has entered the first lane change side adjacent lane during control of the first lane change, the first lane change may be continued, regardless of the length of the command period for the second lane change.

(2) If the command of the second lane change is received during control of the first lane change, the vehicle may be permitted to travel on the original lane where the vehicle was travelling when the command of the first lane change has been received, regardless of the position of the vehicle and the length of the command period for the second lane change.

(3) In the above embodiment, description has been given of control of the lane change when the leftward lane change as the second lane change is commanded during control of the rightward lane change as the first lane change. Alternatively, the first lane change may be a leftward lane change, and the second lane change may be a rightward lane change.

(4) The above embodiment exemplifies the direction indicator switch 18 having the operational positions indicating leftward or rightward traveling directions and the neutral position. Alternatively, the direction indicator switch may be a switch not having the neutral position but a switch enabling selection of either the leftward or rightward traveling direction with one switching operation.

In the case of this switch, if a rightward lane change is commanded by one switching operation, another switching operation is not performed until the subsequent command of lane change. If a switching operation is performed once after the termination of the rightward lane change, a leftward lane change is executed. If the switching operation is performed twice consecutively, a rightward lane change is executed.

(5) In the above embodiment, both the camera 10 and the millimeter wave radar 12 are each used as a surroundings detection sensor which detects an object around the vehicle and a white line. Alternatively, the surroundings detection sensor may be, for example, either the camera 10 or the millimeter wave radar 12. Another sensor as a surroundings detection sensor may be added to the camera 10 and the millimeter wave radar 12, or another sensor other than the camera 10 and the millimeter wave radar 12 may be used.

(6) A plurality of functions of one component of the above embodiment may be implemented by a plurality of components, or one function of one component may be implemented by a plurality of components. A plurality of functions of a plurality of components may be implemented by one component, or one function implemented by a plurality of components may be implemented by one component. Part of the configuration of the above embodiment may be omitted. At least part of the configuration of the above embodiment may be added to or replaced with another configuration of the above embodiment. The embodiment of the present disclosure should encompass all the modes included in the technical idea specified only by the wording of the claims.

(7) In addition to the above-described driving support apparatus 30, the present disclosure can be accomplished in various forms such as a driving support system 2 including the driving support apparatus 30 as a component, a traveling support program by which a computer is functioned as the driving support apparatus 30, and a recording medium, or a driving support method where the traveling support program is recorded.

The invention claimed is:

1. A driving support apparatus, comprising:
a reception unit configured to receive a lane change command which is either a leftward lane change command or a rightward lane change command from an input device, the lane change command being inputted by an occupant of a vehicle;
a traveling control unit configured to control a lane change based on the lane change command received from the input device by the reception unit;
a lighting control unit configured to turn on and off a lane change side direction indicator, based on the lane change command; and
a command determination unit configured to cancel control of the lane change performed by the traveling control unit and cause the lighting control unit to turn off the lane change side direction indicator, in spite of the reception unit receiving a command for a first lane change and the traveling control unit starting a control of the first lane change, in response to a command of a second lane change in a direction opposite to the first lane change being received before part of the vehicle enters an adjacent lane from a traveling lane where the vehicle travels,
wherein the adjacent lane is positioned adjacent to the traveling lane,
wherein the command determination unit is configured to prohibit controlling both the leftward and the rightward lane changes performed by the traveling control unit, and prohibit the lighting control unit from lighting the lane change side direction indicator, in response to a number of times that the reception unit receives the command of the second lane change while the traveling control unit controls the first lane change not being less than a predetermined number of times, and
wherein the predetermined number of times is set as a number of times that indicates that an abnormality of the input device is a cause for cancelling the first lane change and commanding the second lane change during control of the first lane change.

2. The driving support apparatus according to claim 1, wherein:
the command determination unit causes the traveling control unit to control the second lane change, and causes the lighting control unit to turn on a second lane change side direction indicator, in response to a command period of the second lane change received by the reception unit not being less than a predetermined period with which a command is determined to be given by the occupant, and in response to at least part of the vehicle having not entered the adjacent lane.

3. The driving support apparatus according to claim 1, wherein:
the command determination unit causes the traveling control unit to control the second lane change to return to the traveling lane where the vehicle was travelling when the reception unit received the first lane change, and causes the lighting control unit to turn on a second lane change side direction indicator, in response to a command period of the second lane change received by the reception unit not being less than a predetermined period with which a command is determined to be given by the occupant, and in response to at least part of the vehicle having entered the adjacent lane.

4. A method for providing driving support to an occupant of a vehicle, the method comprising:
receiving a lane change command from an input device, the lane change command comprising either a leftward lane change command or a rightward lane change command, the lane change command being inputted by the occupant of the vehicle;
controlling a lane change based on the lane change command received from the input device;
turning on and off a lane change side direction indicator, based on the lane change command;
canceling control of the lane change and causing the lane change side direction indicator to be turned off, in spite of receiving a command for a first lane change and starting a control of the first lane change, in response to a command of a second lane change in a direction opposite to the first lane change being received before part of the vehicle enters an adjacent lane from a traveling lane where the vehicle travels, the adjacent lane being positioned adjacent to the traveling lane; and
prohibiting control of the lane change and lighting of the lane change side direction indicator, in response to a number of times that the command of the second lane change is received while controlling the first lane change not being less than a predetermined number of times,
wherein the predetermined number of times is set as a number of times that indicates that an abnormality of the input device is a cause for cancelling the first lane change and commanding the second lane change during control of the first lane change.

* * * * *